(12) United States Patent
Ryu

(10) Patent No.: US 8,459,978 B2
(45) Date of Patent: Jun. 11, 2013

(54) METHOD FOR MANUFACTURING A COMPOSITE DRIVE SHAFT MANUFACTURED USING MOLD

(76) Inventor: Choong O Ryu, Gimhae-si (KR)

( * ) Notice: Subject to any disclaimer, the term of this patent is extended or adjusted under 35 U.S.C. 154(b) by 349 days.

(21) Appl. No.: 12/593,287

(22) PCT Filed: Apr. 7, 2008

(86) PCT No.: PCT/KR2008/001953
§ 371 (c)(1),
(2), (4) Date: Sep. 25, 2009

(87) PCT Pub. No.: WO2008/123725
PCT Pub. Date: Oct. 16, 2008

(65) Prior Publication Data
US 2010/0113169 A1     May 6, 2010

(30) Foreign Application Priority Data

Apr. 10, 2007  (KR) .................. 10-2007-0034898

(51) Int. Cl.
*B28B 7/20*     (2006.01)
*B28B 21/86*    (2006.01)

(52) U.S. Cl.
CPC . *B28B 7/20* (2013.01); *B28B 21/86* (2013.01); *Y10S 425/058* (2013.01)
USPC ........... 425/182; 425/577; 425/460; 425/467; 425/DIG. 58; 249/183; 249/184; 249/186; 164/245; 164/247; 164/346; 164/366; 164/370; 264/318

(58) Field of Classification Search
USPC ............... 249/142, 160, 168, 169, 173, 183, 249/184, 186, 59, 178, 180; 425/190, 577, 425/438, 460, 466–468, 572, 182, 184, 185, 425/DIG. 58; 264/318; 164/137, 245–248, 164/340, 346, 365–370
See application file for complete search history.

(56) References Cited

U.S. PATENT DOCUMENTS

| | | | | |
|---|---|---|---|---|
| 6,013 A | * | 1/1849 | Warner | 164/30 |
| 372,600 A | * | 11/1887 | Carson | 425/429 |
| 485,949 A | * | 11/1892 | Kramer | 164/248 |
| 887,206 A | * | 5/1908 | Logan | 249/94 |
| 1,270,886 A | * | 7/1918 | Siptrott | 249/186 |

(Continued)

FOREIGN PATENT DOCUMENTS

| | | |
|---|---|---|
| DE | 102 26 093 | 7/2003 |
| DE | 60 2006 000 018 | 2/2008 |

(Continued)

*Primary Examiner* — Dimple Bodawala
(74) *Attorney, Agent, or Firm* — Christopher Paul Mitchell

(57) ABSTRACT

A mold for manufacturing a composite drive shaft, most of which, except for opposite ends functioning as power transmission parts, has a tubular shape with a circular cross-section similar to that of a general shaft, and the shape of each end of which is changed so as to realize easy removal of the drive shaft from the mold after molding. Further, the present invention provides a composite drive shaft, which is manufactured using the mold and is configured such that, when a connection joint (metal yoke) is assembled with each end of the drive shaft, the drive shaft can be rotated in an integrated state realized by the connection joints. Thus, the composite drive shaft of the present invention can directly transmit power, instead of a mechanical fastening jointing technique or an adhesive bonding jointing technique, thus efficiently transmitting high torque.

3 Claims, 2 Drawing Sheets

U.S. PATENT DOCUMENTS

| | | | | |
|---|---|---|---|---|
| 1,764,889 A * | 6/1930 | Redmond | | 164/137 |
| 1,792,580 A * | 2/1931 | Fehrenbach | | 148/437 |
| 2,755,528 A * | 7/1956 | Bucken | | 164/6 |
| 3,216,072 A * | 11/1965 | Bauer | | 164/46 |
| 4,130,264 A * | 12/1978 | Schroer | | 249/180 |
| 4,541,605 A * | 9/1985 | Kubota et al. | | 249/142 |
| 4,579,494 A * | 4/1986 | Bierwith | | 411/512 |
| 4,861,257 A * | 8/1989 | Siotani | | 425/438 |
| 5,690,159 A * | 11/1997 | Mizukusa | | 164/132 |
| 5,700,415 A * | 12/1997 | Hiroki et al. | | 264/318 |
| 5,924,472 A * | 7/1999 | Suzuki et al. | | 164/137 |
| 6,978,976 B2 * | 12/2005 | Duquette et al. | | 249/176 |
| 2006/0042336 A1 | 3/2006 | Smith et al. | | 70/432 |
| 2009/0152770 A1* | 6/2009 | Mikac et al. | | 264/334 |
| 2010/0323051 A1* | 12/2010 | Helenius et al. | | 425/161 |

FOREIGN PATENT DOCUMENTS

| | | | | |
|---|---|---|---|---|
| EP | 1 637 309 | | | 3/2006 |
| JP | 50-077665 | | | 7/1975 |
| JP | 53-130340 | | | 10/1978 |
| JP | 05057760 | A | * | 3/1993 |
| JP | 06-264922 | | | 9/1994 |
| JP | 02530571 | | | 12/1996 |
| JP | 03-099533 | | * | 8/2000 |
| KR | 10-0241232 | | | 11/1999 |
| KR | 10-0432991 | | | 6/2003 |
| KR | 10-2004-0006568 | | | 1/2004 |
| KR | 10-0526020 | | | 6/2005 |
| KR | 10-0515800 | | | 9/2005 |

* cited by examiner

METHOD FOR MANUFACTURING A COMPOSITE DRIVE SHAFT MANUFACTURED USING MOLD

RELATED APPLICATIONS

This application is a 371 application of International Application No. PCT/KR2008/001953, filed Apr. 7, 2008, which in turn claims priority from Korean Patent Application No. 10-2007-0034898, filed Apr. 10, 2007, both of which of which are incorporated herein by reference.

TECHNICAL FIELD

The present invention relates, in general, to molds for manufacturing composite drive shafts and, more particularly, to a mold for manufacturing composite drive shafts, which is configured to manufacture a composite drive shaft, most of which, except for opposite ends functioning as power transmission parts of the drive shaft, has a tubular shape with a circular cross-section similar to that of a general shaft, and the shape of each end of which is changed so as to realize easy removal of the drive shaft from the mold after molding. Further, the present invention relates to a composite drive shaft, which is manufactured using the mold and is configured such that, when a connection joint (metal yoke) is assembled with each end of the drive shaft, the drive shaft can be rotated in an integrated state realized by the connection joints.

BACKGROUND ART

A drive shaft is a device that transmits the rotating force of an engine or a gear box to driving axles, and is widely used in machinery including transport machines, such as automobiles, ships and aircraft.

A conventional drive shaft is made of metal and is typically produced by separately producing a tube part and a universal joint part of the shaft and press-fitting and welding them into a single shaft. In the related art, drive shafts made from steel or aluminum are widely used. However, the metal drive shaft is problematic in that it is heavy and has a low lateral directional resonance frequency. Thus, when the length of the metal drive shaft is not less than 2 meters, the drive shaft may resonate within a range of a maximum engine rpm and may break due to the low lateral directional resonance frequency thereof. Therefore, two metal drive shafts, each having a short length of about 1 meter, are separately produced and are connected to each other to form a jointed single drive shaft. However, to connect the two short metal drive shafts to each other, a universal joint must be used, resulting in an increase in the weight and operational noise of the drive shaft.

In an effort to solve the problems with the conventional metal drive shafts, a composite drive shaft, made of a fiber-reinforced composite material, has been proposed and used. The fiber-reinforce composite drive shaft has a higher specific rigidity, a higher specific strength, a higher resonance frequency and a higher vibration damping capability, compared to the conventional metal drive shafts, so that a fiber-reinforced composite drive shaft having a length equal to or longer than 2 meters can be produced and used. Further, when a drive shaft is produced using the fiber-reinforced composite material, the drive shaft eliminates the need for the universal joint, so that the drive shaft can be even lighter and generates less noise. Thus, in advanced countries, such fiber-reinforced composite drive shafts are preferably used in special applications, such as in racing cars or aircraft.

The conventional composite drive shaft is produced through the following process. First, a fiber-reinforced composite material is layered on the circumferential surface of a mandrel, which has a circular cross-section and is coated with a release agent on the surface, prior to winding a compression film made of a high polymer, such as polypropylene or polyethylene, on the surface. Thereafter, the mandrel having the composite material thereon is covered with a vacuum bag, made of a high temperature nylon film, and high temperature and high pressure are applied to the interior of the vacuum bag from external sources in the state in which the interior of the vacuum bag is maintained in a vacuum state using a vacuum pump, thus hardening the composite material. When the composite material on the mandrel has been completely hardened, the mandrel is removed from the hardened fiber-reinforced composite material, thus providing a composite drive shaft.

Another conventional method of producing composite drive shafts has been proposed and is disclosed in Korean Patent No. 241232. The method comprises: layering a fiber-reinforced composite material on the circumferential surface of a mandrel coated with a release agent; inserting a heat shrinkable tube, made of a heat shrinkable material selected from the group consisting of cross-linked polyolefin, polyethylene and polypropylene, into the fiber-reinforced composite material layered on the surface of the mandrel; heating the heat shrinkable tube in an oven, thus allowing the resin to be charged in the fiber-reinforced composite material and hardening the fiber-reinforced composite material; and removing the hardened fiber-reinforced composite material from the mandrel, thus providing a composite drive shaft.

Each of the composite drive shafts, produced through the above-mentioned conventional methods, has a tubular shape, which has a constant cross-section from a first end to a second end thereof. Thus, a variety of techniques for connecting respective connection joints (metal yokes) to the opposite ends of a conventional composite drive shaft have been actively studied and developed. The conventional techniques of connecting respective connection joints to the opposite ends of a composite drive shaft are classified into mechanical fastening jointing and adhesive bonding jointing.

To realize mechanical fastening jointing, a composite material is holed and, thereafter, a connection joint is mechanically fastened to the hole in an associated end of the composite material through pinning, bolting or riveting. However, such mechanical fastening jointing is problematic in that the holing process may damage the texture of the composite material of the drive shaft due to the breakage of fibers of the composite material caused by the holing. Further, because the composite material is an anisotropic material, the stress concentration factor in the mechanically fastened part of the composite material may be increased compared to that of an isotropic material. Another problem with the mechanical fastening jointing resides in that the stress concentrated portion in the composite material may be easily fatigued when a load is repeatedly applied thereto, and noise and vibration may be easily generated in the mechanically fastened part due to the asymmetry of the mechanically fastened part.

Compared to the mechanical fastening jointing, adhesive bonding jointing is advantageous in that it can distribute a load over a larger area and eliminates the need to form holes in the composite material, so that it avoids breaking fibers of the composite material. Thus, adhesive bonding jointing allows the adhesively bonded part to efficiently resist a load repeatedly applied thereto and to be less fatigued, and reduces noise and vibration, unlike the mechanical fastening jointing. However, the adhesive bonding jointing requires a process of treating the surface of the bonded product and is limited by temperature, humidity, etc. Further, the bonding strength of the bonded part may be easily changed according to the skill of a worker during a bonding process. Particularly, because a bonding agent used in the adhesive bonding jointing has a high brittleness index, it is almost impossible to adapt the adhesive bonding jointing to a structure, which may be repeatedly loaded or may receive a load or a torque higher than the bonding strength of a bonding agent used in the adhesive bonding jointing.

Thus, in an effort to overcome the problems of the conventional techniques of connecting the connection joints to a composite drive shaft, a variety of techniques have been proposed. For example, to connect respective connection joints (metal yokes) to the opposite ends of a composite drive shaft, Korean Patent No. 432991 proposed a thermal fitting technique, Korean Laid-open Publication No. 2004-0006568 proposed a thermal press-fitting technique, Korean Patent No. 515800 proposed a mechanical press-fitting technique, and Korean Patent No. 526020 proposed a press-fitting and thermal fitting technique using an insert ring. However, the above-mentioned conventional techniques, using the difference in the physical property between two materials, are problematic in that they require complicated processes, in which heating and/or cooling must be executed to realize the connection of the two materials and the application of an external force must be executed to realize mechanical engagement of the two materials.

The inventor of the present invention has discovered that the problems with the conventional techniques are caused by the fact that the shape of each of the conventional composite drive shafts is tubular, and has a constant cross-section from a first end to a second end. Thus, in an effort to overcome the problems of the conventional techniques, the inventor has completed the present invention paying attention to a mold capable of producing a composite drive shaft, which is configured to allow a connection joint to be easily jointed to each end of the shaft.

DISCLOSURE OF INVENTION

Technical Problem

Accordingly, the present invention has been made keeping in mind the above problems occurring in the related art, and is intended to provide a composite drive shaft manufacturing mold, which is configured to manufacture a composite drive shaft, most of which, except for opposite ends functioning as power transmission parts of the drive shaft, has a tubular shape with a circular cross-section similar to that of a general shaft, and which can be easily removed from the mold after molding.

The present invention is also intended to provide a composite drive shaft, which is manufactured using the mold and is configured such that, when a connection joint (metal yoke) is assembled with each end of the drive shaft, the drive shaft can be rotated in an integrated state realized by the connection joints.

Technical Solution

In an aspect, the present invention provides a mold for manufacturing a composite drive shaft having a circular tubular shape similar to a shape of a general shaft throughout most of a length thereof, except for opposite ends functioning as power transmission parts, the mold comprising: a central mold unit and a pair of side mold units, the side mold units being removably assembled with opposite sides of the central mold unit through slide fitting, thus forming the circular tubular shape of the mold. The central mold unit may comprise: a pair of surface parts having a round surface in most thereof except for parts corresponding to a first end thereof; and a pair of locking parts configured such that the side mold units can be removed from the opposite sides of the central mold unit by sliding along the locking parts from one end of the central mold unit in longitudinal directions. Each of the side mold units may comprise: a surface part having a round surface in most thereof except for part of a second end thereof opposite the first end of the central mold unit; and a locking part configured such that the locking parts of the side mold units can be removed from the locking parts of the central mold unit by sliding in longitudinal directions.

Further, the first ends of the surface parts of the central mold unit and the second ends of the surface parts of the side mold units may have respective depressions, which form the power transmission parts of the composite drive shaft, and each of which is configured such that, regardless of a position at which each of the depressions is cut in a transverse direction, the transverse directional length of each of the surface parts can be maintained constant, and such that the central mold unit and the side mold units can be removed from the composite drive shaft after molding the composite drive shaft.

Further, each of the depressions may be configured to be symmetrical with the round surface of an associated surface part, and may comprise a curved depression part, which is longitudinally formed from one end of the surface part to a position spaced apart from the end by a predetermined distance, and an inclined depression part, which longitudinally extends from the curved depression part to the round surface of the surface part such that the inclined depression part forms a curved surface.

Each of the locking parts of the central mold unit may have a surface structure, which is configured such that the locking part of an associated side mold unit can be engaged with the locking part of the central mold unit through slide fitting, and which comprises an upper longitudinal locking groove and a lower longitudinal locking groove; and the locking part of each of the side mold units may comprise an upper longitudinal locking protrusion and a lower longitudinal locking protrusion, which can be engaged with the upper longitudinal locking groove and the lower longitudinal locking groove of an associated locking part of the central mold unit. Here, the depressions in the central mold unit may be angularly displaced from the depressions in the side mold units at angles of 90°.

In another aspect, the present invention provides a composite drive shaft manufactured using the mold and having a circular tubular shape similar to a shape of a general shaft along most of a length thereof, except for opposite ends functioning as power transmission parts, wherein the power transmission parts have respective outer depressions and inner protrusions, which are configured such that, regardless of a position at which the drive shaft having the depressions and protrusions is cut in a transverse direction, thickness and transverse directional length thereof can be maintained constant, and such that the central mold unit and the side mold units of the mold can be removed from the composite drive shaft after molding the composite drive shaft.

Each of the outer depressions may be configured to be symmetrical with the round surface of the circular tubular drive shaft and comprises a curved depression part, which is longitudinally formed from one end of the drive shaft to a position spaced apart from the end by a predetermined distance, and an inclined depression part, which longitudinally extends from the curved depression part to the round surface of the drive shaft such that the inclined depression part forms a curved surface. Here, the outer depressions, formed in a first end of the circular tubular drive shaft, and the outer depressions, formed in a second end of the circular tubular drive shaft, may be angularly spaced apart from each other at angles of 90°.

In the present invention, the locking parts of the central mold unit and the side mold units may be configured such that the side mold units can be removed from the central mold unit by pulling the side mold units from the central mold unit outwardly in transverse directions; and a connection member may be provided in each end of the mold so as to integrate the side mold units with the central mold unit into a single body by connecting the side mold units to the central mold unit at the end of the mold.

Described in brief, the present invention provides a mold for manufacturing a composite drive shaft, most of which, except for opposite ends functioning as power transmission parts, has a tubular shape with a circular cross-section similar to that of a general shaft, and the shape of each end of which is changed so as to realize easy removal of the drive shaft from the mold after molding. Further, the present invention provides a composite drive shaft, which is manufactured using the mold and is configured such that, when a connection joint (metal yoke) is assembled with each end of the drive shaft, the drive shaft can be rotated in an integrated state realized by the connection joints.

Advantageous Effects

As described above, the mold according to the present invention is advantageous in that it can manufacture a composite drive shaft, most of which, except for opposite ends functioning as power transmission parts, has a tubular shape with a circular cross-section, similar to that of a general shaft, and in that it allows the drive shaft to be easily removed from the mold after molding.

Further, the composite drive shaft according to the present invention is produced using the mold such that the drive shaft has a structure in which, when respective connection joints (metal yokes) are assembled with the opposite ends of the drive shaft, the drive shaft can be rotated in an integrated state realized by the connection joints, thus efficiently transmitting high torque. In other words, the composite drive shaft of the present invention can directly transmit power instead of a conventional power transmission technique, such as mechanical fastening jointing and adhesive bonding jointing, so that the composite drive shaft of the present invention can efficiently transmit high torque.

Further, the composite drive shaft of the present invention eliminates the need to form holes in power transmitting ends thereof, thus preventing stress concentration which may occur at the holes.

Further, the composite drive shaft of the present invention does not use a power transmission method using a bonding agent, thus eliminating the need for surface treatment, and uses no bonding agent, thus not being affected by variation in weather conditions, such as temperature and humidity.

Further, the composite drive shaft of the present invention may be almost permanently used, until the body of the shaft is broken, instead of breakage at a hole or a bonded surface.

BEST MODE FOR CARRYING OUT THE INVENTION

Hereinbelow, preferred embodiments of a mold for manufacturing composite drive shafts and a composite drive shaft manufactured using the mold according to the present invention will be described in detail.

Figure 1:
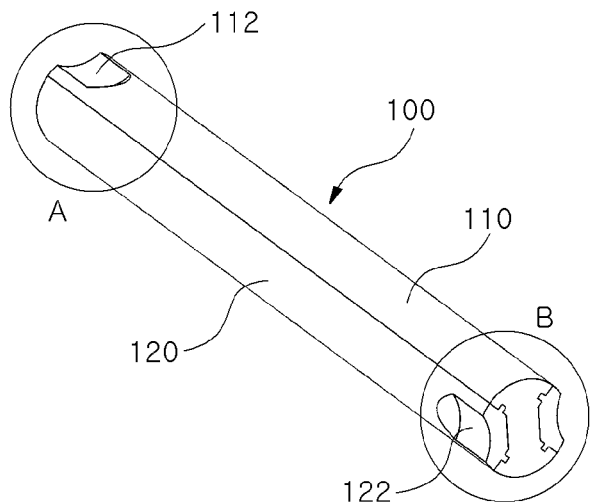
FIG. 1 is a perspective view illustrating the construction of a mold for manufacturing composite drive shafts according to an embodiment of the present invention.
Figure 2:
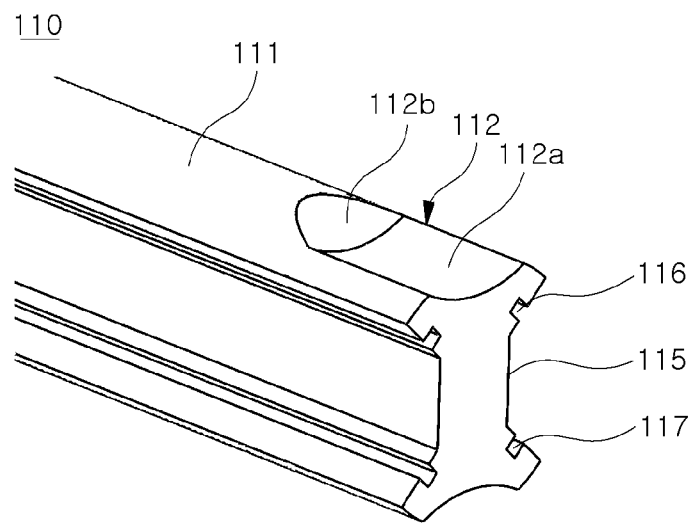
FIG. 2 is an enlarged view illustrating the structure of a central mold unit constituting the mold shown in FIG. 1, which is viewed from the end portion A.
Figure 3:
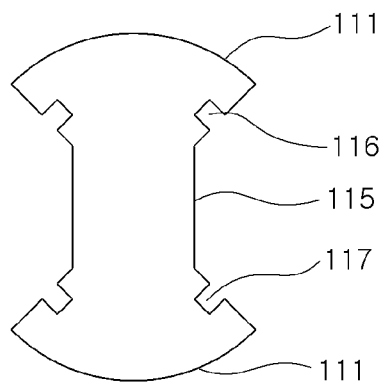
FIG. 3 is a side view illustrating the structure of the central mold unit constituting the mold shown in FIG. 1, which is viewed from the end portion B.
Figure 4:
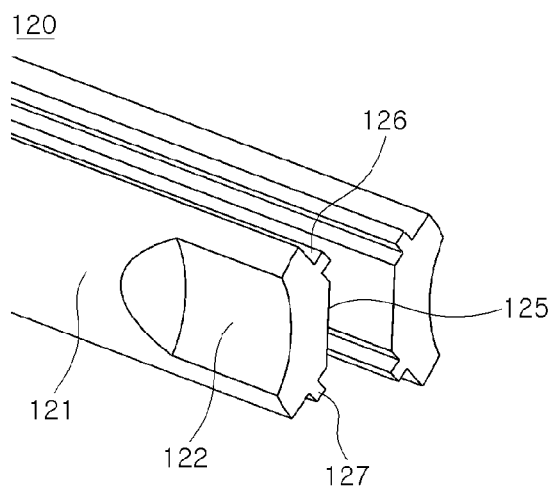
FIG. 4 is an enlarged perspective view illustrating the structure of a pair of side mold units constituting the mold shown in FIG. 1, which is viewed from the end portion B.
Figure 5:
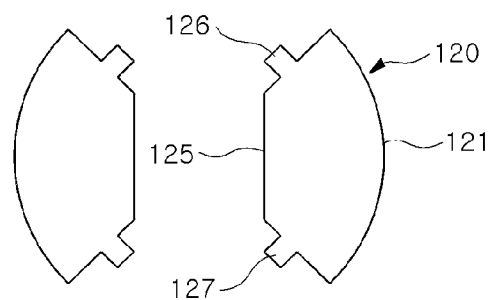
FIG. 5 is a side view illustrating the structure of the side mold units constituting the mold shown in FIG. 1, which is viewed from the end portion A.
Figure 6:
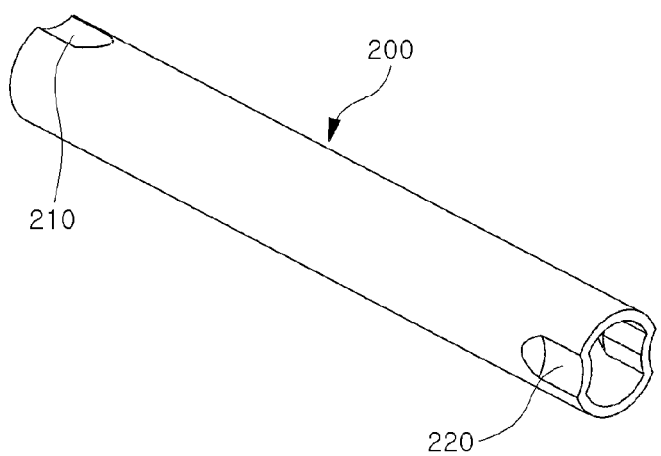
FIG. 6 is a perspective view of a composite drive shaft manufactured using the mold of the present invention shown in FIG. 1.
Figure 7:
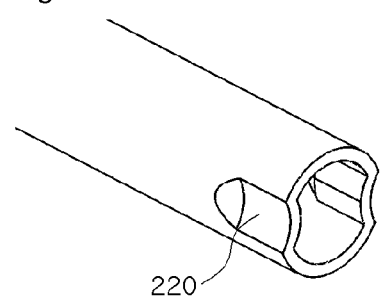
FIG. 7 is an enlarged perspective view illustrating an end of the shaft according to the present invention.

FIG. 1 is a perspective view illustrating the construction of a mold for manufacturing composite drive shafts according to an embodiment of the present invention. FIG. 2 is an enlarged view illustrating the structure of a central mold unit constituting the mold shown in FIG. 1, which is viewed from the end portion A. FIG. 3 is a side view illustrating the structure of the central mold unit constituting the mold shown in FIG. 1, which is viewed from the end portion B. FIG. 4 is an enlarged perspective view illustrating the structure of a pair of side mold units constituting the mold shown in FIG. 1, which is viewed from the end portion B. FIG. 5 is a side view illustrating the structure of the side mold units constituting the mold shown in FIG. 1, which is viewed from the end portion A. FIG. 6 is a perspective view of a composite drive shaft manufactured using the mold of the present invention shown in FIG. 1. FIG. 7 is an enlarged perspective view illustrating an end of the shaft according to the present invention.

As shown in FIG. 1 through FIG. 5, the mold 100 for manufacturing composite drive shafts according to the embodiment of the present invention has a size corresponding to the diameter and length of a desired composite drive shaft 200, which is shown in FIG. 6. The mold 100 comprises a central mold unit 110 and two side mold units 120, which are removably assembled with the opposite sides of the central mold unit 110 through slide fitting. The mold 100 is configured such that most of it has a circular tubular shape, except for the opposite ends.

The central mold unit 110 comprises two surface parts 111 (hereinbelow, referred to as "upper and lower surface parts" based on the drawings) and two locking parts 115 (hereinbelow, referred to as "left and right locking parts" based on the drawings). Most of each of the upper and lower surface parts 111 has a round surface except for part of one end of each. Further, in the end, the upper and lower surface parts 111 have respective depressions 112, which form a first power transmission part 210 in a first end of the drive shaft 200 through molding. Here, the depression 112 is configured such that, when the central mold unit 110 having the depressions 112 is cut in a transverse direction at any portion thereof, the transverse directional length (circumferential length) of each of the surface parts 111 of the central mold unit 110 is constant, and such that the central mold unit 110 can be easily removed from the composite drive shaft 200 after the drive shaft 200 has been completely molded. When the depression 112 is configured such that the transverse directional length of each of the upper and lower surface parts 111 is constant at any portion thereof, as described above, the composite material can be wound around the mold 100 such that the turns of the composite material have the same length regardless of the position in the mold 100, thus preventing creases from forming in the composite material at the ends of the mold 100 during a process of layering the composite material on the mold 100 so as to produce a composite drive shaft 200. Thus, it is easy to produce the composite directive shaft 200 using the mold 100. Further, the respective depressions 112 formed in the upper and lower surface parts 111 are preferably angularly spaced apart from each other at an angle of 180°.

For example, as shown in detail in FIG. 2, each of the depressions 112 comprises a curved depression part 112a and an inclined depression part 112b. The curved depression part 112a is longitudinally formed from one end of the mold 100 to a position spaced apart from the end by a predetermined distance, and is configured to be symmetrical with the round surface of each of the upper and lower surface parts 111. The inclined depression part 112b extends longitudinally inward from the curved depression part 112a to the round surface of each of the upper and lower surface parts 111 such that it forms a curved surface. When the depression 112 is configured in the above-mentioned manner, the transverse directional length of each of the upper and lower surface parts 111 can be maintained constant even when the depression 112 is cut in a transverse direction at any portion thereof. On the other hand, when the depression 112 is cut in the longitudinal direction, there may be a slight difference in the longitudinal length of each of the upper and lower surface parts 111 between the cut portions of the depression 112. However, if the composite material is layered on the mold 100 while utilizing the flexibility of the composite material, the slight difference in the longitudinal length of each of the upper and lower surface parts 111 rarely affects the production of the composite drive shaft 200. Further, even when a crease remains in one end of the composite drive shaft due to the slight difference in the longitudinal length, the drive shaft may be effectively used without being subjected to post-treatment or subsequent cutting in order to remove the creased end from the drive shaft.

Therefore, in the embodiment, if the depression 112 is configured such that, even when the depression 112 is cut in a transverse direction at any portion thereof, the transverse directional length of each of the upper and lower surface parts 111 can be maintained constant, and such that the central mold unit 110 can be easily removed from the composite drive shaft 200 after the drive shaft 200 has been completely molded, the shape of the depression 112 may be changed into a variety of shapes, for example, a trapezoidal shape.

The left and right locking parts 115 of the central mold unit 110 are configured such that the two side mold units 120 can be removably assembled with the opposite side surfaces of the central mold unit 110 through slide fitting. In other words, each of the left and right locking parts 115 of the central mold unit 110 has a specified surface structure, which comprises an upper longitudinal locking groove 116 and a lower longitudinal locking groove 117 so as to be engaged with the locking surface of an associated side mold unit 120. When it is required to assemble the two side mold units 120 with the left and right locking parts 115 of the central mold unit 110, the side mold units 120 can be engaged with the left and right locking parts 115 by sliding the side mold units 120 in longitudinal directions from a first end to a second end of the central mold unit 110, so that, in order to disassemble the side mold units 120 from the left and right locking parts 115, the side mold units 120 must be moved in longitudinal directions until they are completely removed from the left and right locking parts 115.

Thus, if the left and right locking parts 115 are configured such that the side mold units 120 can be removably assembled with the central mold unit 110 by sliding the side mold units 120 in longitudinal directions from a first end to a second end of the central mold unit 110, the locking grooves formed in each of the left and right locking parts 115 may be changed from the upper and lower locking grooves 116 and 117 into another type of locking groove, for example, one trapezoidal locking groove, without affecting the functionality of the present invention.

In the embodiment, the two side mold units 120 are configured to be removably assembled with the left and right locking parts 115 of the central mold unit 110, respectively, through sliding engagement. In other words, each of the side mold units 120 comprises a surface part 121 and a locking part 125. Most of the surface part 121 of each side mold unit 120 has a round surface, except for part of one end thereof. Further, in the end, the surface part 121 of each side mold unit 120 has a depression 122, which forms a second power transmission part 220 in a second end of the composite drive shaft 200 through molding. The depression 122 formed in each of the two side mold units 120 is configured to have the same shape as that of the depression 112 formed in the central mold unit 110, so as to execute the same function as that of the depression 112. In a longitudinal direction, the respective depressions 122 of the two side mold units 120 are located at positions opposite the depressions 112 of the central mold unit 110. Here, it is preferred that the depressions 122 be angularly spaced apart from the depressions 112 of the central mold unit 110 at angles of 90°. When the depressions 112 and 122 of the central mold unit 110 and the side mold units 120 are angularly spaced apart from each other at angles of 90°, as described above, the first and second power transmission parts 210 and 220 of the produced composite drive shaft 200 can execute a uniform power transmitting function. Further, after the composite drive shaft 200 has been completely molded, the central mold unit 110 and the side mold units 120 can be easily removed from the produced composite drive shaft 200 by moving the mold units 110 and 120 in directions opposite the respective depressions 112 and 122 thereof.

The respective locking parts 125 of the two side mold units 120 are configured to be removably assembled with the left and right locking parts 115 of the central mold unit 110 through sliding engagement. Described in detail, the locking part 125 of each of the side mold units 120 has a specified surface structure, which can be engaged with an associated one of the left and right locking parts 115 of the central mold unit 110 through sliding engagement. In order to realize the above-mentioned structure, the locking part 125 of each side mold unit 120 comprises an upper longitudinal locking protrusion 126 and a lower longitudinal locking protrusion 127, which can be engaged with the upper longitudinal locking groove 116 and the lower longitudinal locking groove 117 of an associated locking part 115 of the central mold unit 110. When it is required to assemble the two side mold units 120 with the central mold unit 110, the side mold units 120 can be engaged with the central mold unit 110 by sliding the side mold units 120 in longitudinal directions from a first end to a second end of the central mold unit 110, so that, in order to disassemble the side mold units 120 from the central mold unit 110, the side mold units 120 must be moved in longitudinal directions until they are completely removed from the central mold unit 110.

Thus, if the locking parts 125 of the side mold units 120 are configured such that the side mold units 120 can be removably assembled with the central mold unit 110 by sliding the side mold units 120 in longitudinal directions from a first end to a second end of the central mold unit 110, the structure of the locking parts 125 may be changed into a variety of types.

In the embodiment, the mold 100 is configured such that, when it is required to disassemble the side mold units 120 from the central mold unit 110, the side mold units 120 must be moved in longitudinal directions until they are completely removed from the central mold unit 110. In other words, the mold 100 of the embodiment is configured to have the upper and lower longitudinal locking grooves 116 and 117 and the upper and lower longitudinal locking protrusions 126 and 127, which can be engaged with the upper and lower longitudinal locking grooves 116 and 117. However, the construction of the mold according to the present invention may be changed such that the side mold units 120 can be removed from the central mold unit 110 by pulling the side mold units 120 from the central mold unit 110 outward in transverse directions instead of sliding the side mold units 120 in longitudinal directions from a first end to a second end of the central mold unit 110. Described in detail, the mold of the present invention may be configured such that the locking parts 115 of the central mold unit 110 and the locking parts 125 of the side mold units 120 can be engaged with each other through sliding movement and the side mold units 120 can be removed from the central mold unit 110 by pulling the side mold units 120 from the central mold unit 110 outwards in transverse directions, and a connection member is provided in the mold so as to integrate the two side mold units 120 with the central mold unit 110 into a single body by connecting the side mold units 120 to the central mold unit 110 at each end of the mold. When it is required to remove a composite drive shaft from the above-mentioned mold after the drive shaft has been completely molded using the mold, the connection members provided in the opposite ends of the mold are primarily disassembled from the mold and, thereafter, the side mold units 120 and the central mold unit 110 are removed from the drive shaft by sliding the mold units 110 and 120 in longitudinal directions.

As shown in FIG. 6 and FIG. 7, the composite drive shaft 200 according to the embodiment of the present invention is produced using a fiber-reinforced composite material such that most thereof, except for the opposite ends, has a tubular shape having a circular cross-section similar to that of a general shaft. In other words, the composite drive shaft 200 is configured such that the opposite ends thereof have the first and second power transmission parts 210 and 220 corresponding to the depressions 112 and 122 in the central mold unit 110 and the side mold units 120. The first and second power transmission parts 210 and 220 have respective shapes corresponding to the depressions 112 and 122 in the mold units 110 and 120 and have respective outer depressions and respective inner protrusions, which are configured to maintain the thickness of the drive shaft constant throughout the length thereof. Here, each of the outer depressions of the composite drive shaft is configured to be symmetrical with the round surface of the circular tubular shaft, and comprises a curved depression part, which is longitudinally formed from one end of the drive shaft to a position spaced apart from the end by a predetermined distance, and an inclined depression part, which longitudinally inwardly extends from the curved depression part to the round surface of the drive shaft such that it forms a curved surface. Further, the outer depressions, formed in the first end of the circular cross-sectional drive shaft, and the outer depressions, formed in the second end of the circular cross-section drive shaft, are angularly spaced apart from each other at angles of 90°. Here, a carbon tape may be circumferentially wound several turns around each of the first and second power transmission parts 210 and 220, thus reinforcing the ends of the composite drive shaft.

Although the embodiments of a mold for manufacturing composite drive shafts and a composite drive shaft produced using the mold have been disclosed for illustrative purposes with reference to the accompanying drawings, the embodiments are not intended to indicate the limits of the present invention.

Those skilled in the art will appreciate that various modifications, additions and substitutions are possible, without departing from the scope and spirit of the invention as disclosed in the accompanying claims.

INDUSTRIAL APPLICABILITY

As described above, the present invention provides a composite drive shaft, which is made of a composite material and is used for transmitting the rotating force of an engine or a gear box to driving axles, thus allowing the composite drive shafts to be widely used in machinery including transport machines, such as automobiles, ships and aircraft.

The invention claimed is:

1. A mold for manufacturing a composite drive shaft having a circular tubular shape similar to a shape of a general shaft throughout most of a length thereof, except for opposite ends functioning as power transmission parts, the mold comprising:

a central mold unit and a pair of side mold units, the side mold units being removably assembled with opposite sides of the central mold unit through slide fitting, thus forming the circular tubular shape of the mold, wherein the central mold unit comprises:

a pair of surface parts having a round surface in most thereof except for parts corresponding to a first end thereof; and a pair of locking parts configured such that the side mold units can be removed from the opposite sides of the central mold unit by sliding, the side mold units along the pair of locking parts of the central mold unit from an end of the central mold unit in a longitudinal direction;

wherein each of the side mold units comprises:

a surface part having a round surface in most thereof except for part of a second end thereof opposite the first end of the central mold unit; and a locking part configured such that the locking parts of the side mold units can be removed from the locking parts of the central mold unit by sliding in a longitudinal direction; and wherein the first end of the surface parts of the central mold unit and the second end of the surface parts of the side mold units have respective depressions, wherein each of the depressions is configured to be symmetrical with a round surface of an associated surface part of the central mold unit and the side mold units, and comprises a curved depression part is a longitudinally formed from one end of the surface part of the central mold unit and the side mold unit to a position spaced apart from the end by predetermined distance, and an inclined depression part, which extends longitudinally inward from the curved depression part to the round surface of the surface parts such that the inclined depression part forms a curved surface, wherein each of the depressions configured to form the power transmission parts of the composite drive shaft, and each of which is configured such that, regardless of a position at which each of the depressions is cut in a transverse direction, a transverse directional length of each of the surface parts can be maintained constant, and such that the central mold unit and the side mold units can be removed from the composite drive shaft after molding the composite drive shaft;

wherein the central mold unit and the pair of side mold units configured to receive thereon fiber-reinforced composite material to be hardened; and the side mold units to be removed from the central mold unit by sliding the locking parts of the side mold units along the locking parts of the central mold unit in longitudinal directions.

2. The mold for manufacturing the composite drive shaft according to claim 1, wherein each of the locking parts of the central mold unit has a surface structure, which is configured such that the locking part of an associated one of the side mold units can be engaged with the locking part of the central mold unit through slide fitting, and which comprises an upper longitudinal locking groove and a lower longitudinal locking groove; and the locking part of each of the side mold units comprises an upper longitudinal locking protrusion and a lower longitudinal locking protrusion, which can be engaged with the upper longitudinal locking groove and the lower longitudinal locking groove of an associated one of the pair of locking parts of the central mold unit.

3. The mold for manufacturing the composite drive shaft according to claim 2, wherein the depressions in the central mold unit are angularly displaced from the depressions in the side mold units at angles of 90°.

* * * * *